United States Patent
Estes et al.

(10) Patent No.: US 6,347,282 B2
(45) Date of Patent: *Feb. 12, 2002

(54) MEASUREMENT-WHILE-DRILLING ASSEMBLY USING GYROSCOPIC DEVICES AND METHODS OF BIAS REMOVAL

(75) Inventors: Robert A. Estes, Tomball, TX (US); Koen Antonie Noy, Almerehout (NL); Jon B. Kahn, Spring, TX (US)

(73) Assignee: Baker Hughes Incorporated, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 13 days.

(21) Appl. No.: 09/204,908

(22) Filed: Dec. 3, 1998

Related U.S. Application Data

(60) Provisional application No. 60/067,505, filed on Dec. 4, 1997.

(51) Int. Cl.[7] ................................................. G01V 1/48
(52) U.S. Cl. ........................................................ 702/6
(58) Field of Search ............ 702/6, 9, 10; 324/338–343; 33/302, 303, 304, 310, 312, 313; 175/45

(56) References Cited

U.S. PATENT DOCUMENTS

| | | | |
|---|---|---|---|
| 3,753,296 A | 8/1973 | Van Steenwyk | 33/304 |
| 4,199,869 A | 4/1980 | Van Steenwyk | 33/302 |
| 4,345,454 A * | 8/1982 | Brown | 33/313 |
| 4,433,491 A | 2/1984 | Ott et al. | 33/302 |
| 4,468,863 A | 9/1984 | Van Steenwyk | 33/304 |
| 4,471,533 A | 9/1984 | Van Steenwyk et al. | 33/302 |
| 4,472,884 A | 9/1984 | Engebretson | 33/304 |
| 4,542,647 A * | 9/1985 | Molnar | 33/304 |
| 4,559,713 A | 12/1985 | Ott et al. | 33/302 |
| 4,594,790 A | 6/1986 | Engebretson | 33/304 |
| 4,611,405 A | 9/1986 | Van Steenwyk | 33/304 |
| 4,682,421 A * | 7/1987 | Van Dongen et al. | 33/302 |
| 4,706,388 A | 11/1987 | Van Steenwyk | 33/304 |

(List continued on next page.)

FOREIGN PATENT DOCUMENTS

| | | |
|---|---|---|
| DE | 19505855 C1 | 2/1999 |
| EP | 0 175 298 | 3/1986 |

OTHER PUBLICATIONS

Titterton, D.H. et al., "Strapdown inertial navigation technology,"pp. 270–272, IEE Radar, Sonar, Navigation and Avionics Series 5 (1997).

Primary Examiner—Donald E. McElheny, Jr.
(74) Attorney, Agent, or Firm—Madan, Mossman & Sriram, P.C.

(57) ABSTRACT

This invention provides a measurement-while-drilling (MWD) downhole assembly for use in drilling boreholes which utilizes gyroscopes, magnetometers and accelerometers for determining the borehole inclination and azimuth during the drilling of the borehole. The downhole assembly includes at least one gyroscope that is rotatably mounted in a tool housing to provide signals relating to the earth's rotation. A device in the tool can rotate the gyroscope and other sensors on the tool at any desired degree. A processor in the tool combines measurements from the sensors taken at a plurality of positions at the same depth to determine the systematic bias in the sensors before further processing. Accelerometers in the MWD tool provide gravity measurements from which the toolface and inclination are determined. The unbiased gyroscopic measurements are used in conjunction with the tool face and inclination measurements to determine the azimuth and tool face with respect to true north. Three axially spaced apart magnetometers may be used to correct for local magnetic disturbances. Additionally, when measurements are made with magnetic, accelerometer and gyroscopic measurements along three different axes, the unbiased measurements may be combined to provide an improved determination of the tool orientation.

32 Claims, 7 Drawing Sheets

U.S. PATENT DOCUMENTS

| | | | | |
|---|---|---|---|---|
| 4,709,486 A | * | 12/1987 | Walters | 33/304 |
| 4,761,889 A | * | 8/1988 | Cobern et al. | 33/302 |
| 4,819,336 A | * | 4/1989 | Russell | 33/304 |
| 4,833,787 A | | 5/1989 | Van Steenwyk | 33/302 |
| 4,894,923 A | * | 1/1990 | Cobern et al. | 33/304 |
| 4,909,336 A | * | 3/1990 | Brown et al. | 33/304 |
| 4,920,655 A | | 5/1990 | Van Steenwyk | 33/304 |
| 4,956,921 A | * | 9/1990 | Coles | 33/304 |
| 4,999,920 A | * | 3/1991 | Russell et al. | 33/304 |
| 5,155,916 A | | 10/1992 | Engebretson | 33/302 |
| 5,321,893 A | * | 6/1994 | Engebretson | 33/304 |
| 5,432,699 A | | 7/1995 | Hache et al. | 324/422 |
| 5,435,069 A | * | 7/1995 | Nicholson | 33/304 |
| 5,452,518 A | * | 9/1995 | DiPersio | 33/304 |
| 5,564,193 A | * | 10/1996 | Brooks | 33/304 |
| 5,623,407 A | * | 4/1997 | Brooks | 702/6 |
| 5,657,547 A | | 8/1997 | Uttecht et al. | 33/304 |
| 5,679,894 A | | 10/1997 | Kruger et al. | 73/152.03 |
| 5,806,194 A | * | 9/1998 | Rodney et al. | 33/304 |

* cited by examiner

MEASUREMENT-WHILE-DRILLING ASSEMBLY USING GYROSCOPIC DEVICES AND METHODS OF BIAS REMOVAL

CROSS REFERENCE TO RELATED APPLICATIONS

This application claims priority from U.S. provisional patent application No. 60/067505 filed on Dec. 4, 1997.

FIELD OF THE INVENTION

This invention relates generally to bottom hole assemblies for drilling oilfield wellbores and more particularly to the use of gyroscopic and other sensors to determine wellbore direction during the drilling of the wellbores and to the correction of data from such sensors.

BACKGROUND OF THE INVENTION

To obtain hydrocarbons such as oil and gas, wellbores (also referred to as the boreholes) are drilled by rotating a drill bit attached at the end of a drilling assembly generally referred to as the "bottom hole assembly" or the "drilling assembly." A large portion of the current drilling activity involves drilling highly deviated and substantially horizontal wellbores to increase the hydrocarbon production and/or to withdraw additional hydrocarbons from the earth's formations. The wellbore path of such wells is carefully planned prior to drilling such wellbores utilizing seismic maps of the earth's subsurface and well data from previously drilled wellbores in the associated oil fields. Due to the very high cost of drilling such wellbores and the need to precisely place such wellbores in the reservoirs, it is essential to continually determine the position and direction of the drilling assembly and thus the drill bit during drilling of the wellbores. Such information is utilized, among other things, to monitor and adjust the drilling direction of the wellbores.

In the commonly used drilling assemblies, the directional package commonly includes a set of accelerometers and a set of magnetometers, which respectively measure the earth's gravity and magnetic field. The drilling assembly is held stationary during the taking of the measurements from the accelerometers and the magnetometers. The toolface and the inclination angle are determined from the accelerometer measurements. The azimuth is then determined from the magnetometer measurements in conjunction with the tool face and inclination angle.

The earth's magnetic field varies from day to day, which causes corresponding changes in the magnetic azimuth. The varying magnetic azimuth compromises the accuracy of the position measurements when magnetometers are used. Additionally, it is not feasible to measure the earth's magnetic field in the presence of ferrous materials, such as casing and drill pipe. Gyroscopes measure the rate of the earth's rotation, which does not change with time nor are the gyroscopes adversely affected by the presence of ferrous materials. Thus, in the presence of ferrous materials the gyroscopic measurements can provide more accurate azimuth measurements than the magnetometer measurements.

U.S. Pat. No. 5,432,699 discloses a method and apparatus measuring motion signals of gyroscopes in downhole instruments used to determine the heading of a borehole. Accelerometer and magnetometer data along three orthogonal axes of a measurement sub are used to obtain unit gravitational and magnetic vectors. The gyroscope measurements are used to correct the magnetic and gravity measurements made by the magnetometer and the accelerometer respectively. The calculations performed in the correction process by this, and other prior art optimization schemes based upon least squares methods, are valid when the measurements are corrupted by random additive noise. As would be known to those versed in the art, in the presence of systematic measurement errors, such least-squares optimization methods are unreliable.

Commercially available gyroscopes contain systematic errors or biases that can severely deteriorate accuracy of a gyroscope's measurements and thus the azimuth. Gyroscopes have been utilized in wireline survey applications but have not found commercial acceptance in the measurement-while-drilling tools such as bottomhole assemblies.

In wireline applications, the survey tool is conveyed into the wellbore after the wellbore has been drilled, in contrast to the MWD tools wherein the measurements are made during the drilling of the wellbores. Wireline methods are not practical in determining the drilling assembly position and direction during the drilling of the wellbores. In wireline applications, the gyroscopes are used either in a continuous mode or at discrete survey intervals. Wireline survey methods often make it unnecessary to employ techniques to compensate for the present-value of the gyroscope biases. In wireline applications, the gyroscope can be powered-up at the surface and allowed to stabilize (thermally and dynamically) for a relatively long time period. Typically a warm-up period of ten (10) minutes or more is taken. The power to the gyroscope is continuously applied from the beginning at the surface, through the actual wellbore survey and through the final check of the survey tool at the surface at the end of the survey. Therefore, reference alignments can be made at the surface prior to commencing the wellbore survey to adjust or verify the alignment accuracy of the north-seeking gyroscope. The initial independent reference can then be used at the end of the wireline survey. Any bias in the gyroscope in a wireline tool can be measured at the surface by taking the difference in the alignments at the beginning and the end of the survey runs. Furthermore, the wireline tool carrying the gyroscope can easily be rotated at the surface to several different toolface (roll angle) positions to determine the bias present on either of the transverse gyroscopes (i.e., along the x and y axis of the tool) when the tool is at the surface. This bias can be used to verify the accuracy or to correct the gyroscope measurements.

In the MWD environment, the above-noted advantages of the wireline systems are not present. The MWD surveys are usually taken during drill pipe connection times during the drilling of the wellbore, which intervals are relatively short—generally one or two minutes. Power in the MWD tools is generated downhole and/or provided by batteries. To conserve the power, it is desirable to switch off the gyroscopes when not in use because the gyroscopes consume considerable power. For MWD tools utilizing turbine-alternator, the power is generated by flow of the drilling fluid ("mud") which is interrupted at each pipe connection. Even if the power could be applied continuously, the difference in the bias measured at the surface prior to the drilling and post drilling is not considered an accurate measure due to the very long time between drilling assembly trips, which are typically between 30 and 300 hours.

Bias stability from turn-on to turn-on is a major error component for the currently available tactical grade gyroscopes. Removing the bias by rotating the gyroscopes about a vertical axis (long axis) has been utilized in non-drilling applications. Toolface orientation positioning of a bottomhole assembly during the drilling of the wellbores often is not a control variable that can be changed as desired. The depth, hole angle, tool deviation, and borehole condition often limit the ability to acquire sensor data at various roll angles of the bottomhole assembly in the wellbore. Thus, it is important to ensure that gyroscopes used for MWD measurements are bias compensated in real time internally prior to taking measurements at each interval. This can be achieved by determining and removing the biases in the gyroscope in the transverse plane using an internal indexing mechanism in the process of taking measurements downhole at each drilling interval. Biases may also be present in the other measurements, i.e., those made by magnetometers and accelerometers, for the same reasons as discussed above with reference to gyroscopes. It is desirable to remove these biases as well in order to obtain accurate survey information.

The present invention provides bottomhole assemblies that utilize gyroscopes, accelerometers and magnetometers for determining the position and direction of the bottomhole assembly and wherein the biases in the gyroscope, the magnetometer and the accelerometer in the transverse plane are determined and removed downhole during the drilling operations. Once these biases are removed, methods can be used for correction of the measured data based upon the fact that there is a redundancy in the observations made using the three kinds of sensors.

SUMMARY OF THE INVENTION

This invention provides a measurement-while-drilling (MWD) downhole assembly for use in drilling boreholes that utilizes gyroscopes and accelerometers for determining the borehole inclination and azimuth during the drilling of the borehole. The downhole assembly includes at least one gyroscope that is rotatably mounted in a tool housing to provide signals relating to the earth's rotation. A device in the tool can rotate the gyroscope within the tool at any desired degree. In one embodiment of the invention, a processor in the tool combines measurements from the gyroscope taken at two opposing positions at the same depth to determine the systematic bias in the gyroscope before further processing of the signals. In another embodiment of the invention, the tool includes magnetometers and accelerometers so that biases in measurements made by these instruments can also be determined. Additionally, using a plurality of axially spaced apart magnetometers, the magnetic gradient may also be determined, making it possible to correct for local magnetic sources. In another embodiment of the invention, the processor combines measurements taken from accelerometers in the MWD tool to provide gravity measurements from which the toolface and inclination are determined. The unbiased gyroscopic measurements are used in conjunction with the toolface and inclination measurements to determine the azimuth and true north toolface.

This invention also provides a method of eliminating a systematic bias present in a survey instrument deployed in a measurement-while-drilling tool during the drilling of a borehole. The method comprises drilling the borehole utilizing the MWD tool to a depth, followed by rotating the instrument through a plurality of angles while taking measurements with the instrument at each position, and estimating the bias from these multiple measurements Examples of the more important features of the invention have been summarized rather broadly in order that the detailed description thereof that follows may be better understood, and so the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DETAILED DESCRIPTION OF THE PREFERRED EMBODIMENTS

Figure 1:
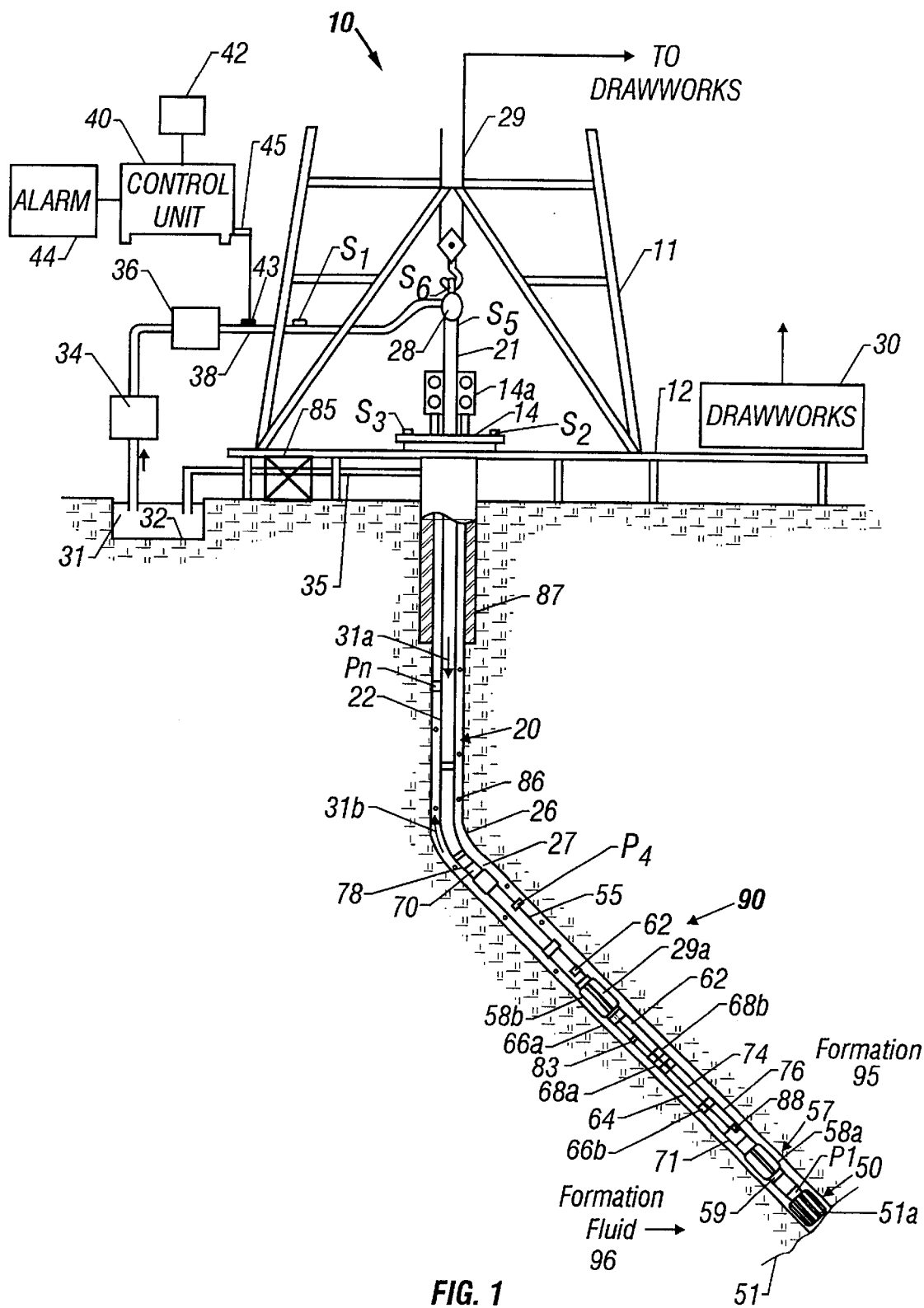
FIG. 1 shows a schematic diagram of a drilling system that employs the apparatus of the current invention in a measurement-while-drilling embodiment.

FIG. 1 shows a schematic diagram of a drilling system 10 having a bottom hole assembly (BHA) or drilling assembly 90 that includes gyroscope(s) according to the present invention. The BHA 90 is conveyed in a borehole 26. The drilling system 10 includes a conventional derrick 11 erected on a floor 12 which supports a rotary table 14 that is rotated by a prime mover such as an electric motor (not shown) at a desired rotational speed. The drill string 20 includes a tubing (drill pipe or coiled-tubing) 22 extending downward from the surface into the borehole 26. A drill bit 50, attached to the drill string 20 end, disintegrates the geological formations when it is rotated to drill the borehole 26. The drill string 20 is coupled to a drawworks 30 via a kelly joint 21, swivel 28 and line 29 through a pulley (not shown). Drawworks 30 is operated to control the weight on bit ("WOB"), which is an important parameter that affects the rate of penetration ("ROP"). A tubing injector 14a and a reel (not shown) are used as instead of the rotary table 14 to inject the BHA into the wellbore when a coiled-tubing is used as the conveying member 22. The operations of the drawworks 30 and the tubing injector 14a are known in the art and are thus not described in detail herein.

During drilling, a suitable drilling fluid 31 from a mud pit (source) 32 is circulated under pressure through the drill string 20 by a mud pump 34. The drilling fluid passes from the mud pump 34 into the drill string 20 via a desurger 36 and the fluid line 38. The drilling fluid 31 discharges at the borehole bottom 51 through openings in the drill bit 50. The drilling fluid 31 circulates uphole though the annular space 27 between the drill string 20 and the borehole 26 and returns to the mud pit 32 via a return line 35 and drill cutting screen 85 that removes the drill cuttings 86 from the returning drilling fluid 31b. A sensor $S_1$ in line 38 provides information about the fluid flow rate. A surface torque sensor $S_2$ and a sensor $S_3$ associated with the drill string 20 respectively provide information about the torque and the rotational speed of the drill string 20. Tubing injection speed is determined from the sensor $S_5$, while the sensor $S_6$ provides the hook load of the drill string 20.

In some applications the drill bit 50 is rotated by only rotating the drill pipe 22. However, in many other applications, a downhole motor 55 (mud motor) is disposed in the drilling assembly 90 to rotate the drill bit 50 and the drill pipe 22 is rotated usually to supplement the rotational power, if required, and to effect changes in the drilling direction. In either case, the ROP for a given BHA largely depends on the WOB or the thrust force on the drill bit 50 and its rotational speed.

The mud motor 55 is coupled to the drill bit 50 via a drive disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the mud motor 55 and the reactive upward loading from the applied weight on bit. A lower stabilizer 58a coupled to the bearing assembly 57 acts as a centralizer for the lowermost portion of the drill string 20.

A surface control unit or processor 40 receives signals from the downhole sensors and devices via a sensor 43 placed in the fluid line 38 and signals from sensors $S_1$–$S_6$ and other sensors used in the system 10 and processes such signals according to programmed instructions provided to the surface control unit 40. The surface control unit 40 displays desired drilling parameters and other information on a display/monitor 42 that is utilized by an operator to control the drilling operations. The surface control unit 40 contains a computer, memory for storing data, recorder for recording data and other peripherals. The surface control unit 40 also includes a simulation model and processes data according to programmed instructions. The control unit 40 is preferably adapted to activate alarms 44 when certain unsafe or undesirable operating conditions occur.

The BHA may also contain formation evaluation sensors or devices for determining resistivity, density and porosity of the formations surrounding the BHA. A gamma ray device for measuring the gamma ray intensity and other nuclear and non-nuclear devices used as measurement-while-drilling devices are suitably included in the BHA 90. As an example, FIG. 1 shows a resistivity measuring device 64. It provides signals from which resistivity of the formation near or in front of the drill bit 50 is determined. The resistivity device 64 has transmitting antennae 66a and 66b spaced from the receiving antennae 68a and 68b. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole computer 70 to determine the resistivity and dielectric values.

An inclinometer 74 and a gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, position sensors, such as accelerometers, magnetometers or a gyroscopic devices may be disposed in the BHA to determine the drill string azimuth, true coordinates and direction in the wellbore 26. Such devices are known in the art and are not described in detail herein.

In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place. The above described resistivity device, gamma ray device and the inclinometer are preferably placed in a common housing that may be coupled to the motor. The devices for measuring formation porosity, permeability and density (collectively designated by numeral 78) are preferably placed above the mud motor 55. Such devices are known in the art and are thus not described in any detail.

As noted earlier, a large portion of the current drilling systems, especially for drilling highly deviated and horizontal wellbores, utilize coiled-tubing for conveying the drilling assembly downhole. In such application a thruster 71 is deployed in the drill string 90 to provide the required force on the drill bit. For the purpose of this invention, the term weight on bit is used to denote the force on the bit applied to the drill bit during the drilling operation, whether applied by adjusting the weight of the drill string or by thrusters. Also, when coiled-tubing is utilized the tubing is not rotated by a rotary table, instead it is injected into the wellbore by a suitable injector 14a while the downhole motor 55 rotates the drill bit 50.

A number of sensors are also placed in the various individual devices in the drilling assembly. For example, a variety of sensors are placed in the mud motor power section, bearing assembly, drill shaft, tubing and drill bit to determine the condition of such elements during drilling and to determine the borehole parameters. The preferred manner of deploying certain sensors in drill string 90 will now be described. The actual BHA utilized for a particular application may contain some or all of the above described sensors. For the purpose of this invention any such BHA could contain one or more gyroscopes and a set of accelerometers (collectively represented herein by numeral 88) at a suitable location in the BHA 90. A preferred configuration of such sensors is shown in FIG. 2A.

Figure 2A:
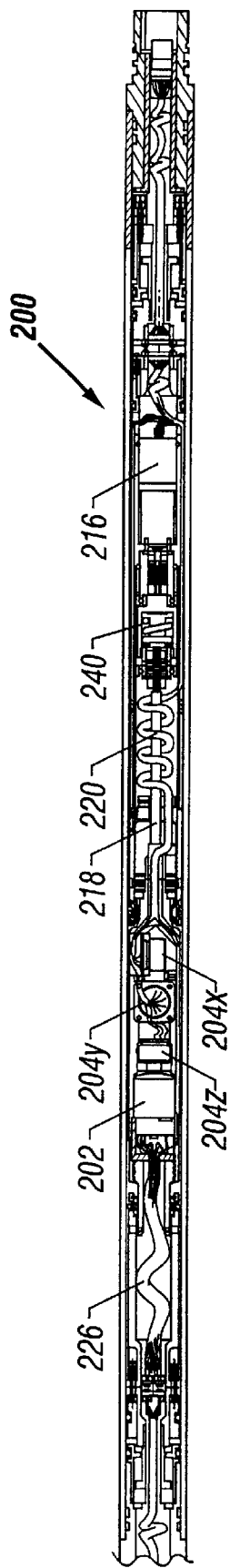
FIG 2A shows a schematic diagram of a portion of the bottomhole assembly with a set of gyroscopes and a corresponding set of accelerometers according to a preferred embodiment of the present invention.

FIG. 2A is a schematic diagram showing a sensor section 200 containing a gyroscope 202 and a set of three accelerometers 204x, 204y and 204z disposed at a suitable location in the bottomhole assembly (90 in FIG. 1) according to one preferred embodiment of the present invention. The gyroscopes 202 may be a single axis gyroscope or a two-axis gyroscope. In vertical and low inclination wellbores, an x-axis and a y-axis gyroscope are deemed sufficient for determining the azimuth and toolface with respect to the true north. The configuration shown in FIG. 2A utilizes a single two-axis (x-axis and y-axis) gyroscope that provides outputs corresponding to the earth's rate of rotation in the two axis (x-axis and y-axis) perpendicular to the borehole axis or the bottomhole assembly longitudinal axis, referred to herein as the z-axis. The sensor 202 thus measures the earth's rotation component in the x-axis and y-axis. The accelerometers 204x, 204y and 204z measure the earth's gravity components respectively along the x, y, and z axes of the bottomhole assembly 90.

The gyroscope 202 and accelerometers 204x–204z are disposed in a rotating chassis 210 that rotates about the radial bearings 212a–212b in a fixed or non-rotating housing 214. An indexing drive motor 216 coupled to the rotating chassis 210 via a shaft 218 can rotate the chassis 210 in the bottomhole assembly 90 about the z-axis, thus rotating the gyroscopes 202 from one mechanical position to another position by any desired rotational angle. A stepper motor is preferred as the indexing drive motor 216 because stepper motors are precision devices and provide positive feedback about the amount of rotation. Any other mechanism, whether electrically-operated, hydraulically-operated or by any other desired manner, may be utilized to rotate the gyroscopes within the bottomhole assembly 90. The gyroscope 202 may be rotated from an initial arbitrary position to a mechanical stop (not shown) in the tool or between two mechanical stops or from an initial peak measurement to a second position as described later. The rotational angle corresponding to a particular axis is selectable.

Although FIG. 2A shows a single two axis gyroscope, a separate gyroscope may be utilized for each axis. A wiring harness 226 provides power to the gyroscope 202 and accelerometers 204x, 204y, 204z. The wiring harness 226 transmits signals from the gyroscope and accelerometers to the processor in the bottomhole assembly 90. Similarly, a suitable wiring harness 220 provides power and signal linkage to the stepper motor 216 and additional downhole equipment. A spring loaded torque limiter 240 may be used to prevent inertial loading caused by drillstring rotation from damaging the gearbox of the stepper motor 216.

Figure 2B:
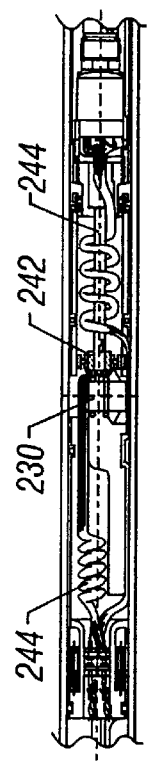
FIG. 2B shows a schematic diagram showing the use of a second two-axis gyroscope in the bottomhole assembly shown in FIG. 2A.

In addition a second two-axis (x-axis and z-axis) gyroscope 230 may be rotatably mounted in the bottomhole assembly 90 in a rotating chassis or in any other manner to measure the rate of rotation in the z-axis and the x-axis, as shown in FIG. 2B. The sensor 230 could be rotated about the y-axis using a bevel gear 242 and a shaft linkage 244 to the rotating chassis 210, thus eliminating the need for an additional motor. The wiring harness 244 for the y-axis gyro 230 must be spooled around the gyro to accommodate the space available in a small diameter housing.

As noted above, an MWD gyroscope requires optimization and/or compensation for several parameters in order to provide the required performance from typical gyroscopic sensors currently available.

One of the error parameters that in some cases is too large for adequate accuracy performance in a typical adaptation of an MWD Gyroscope is the bias on the gyroscope's output. Some gyroscopes have small error values for the "bias random walk" term, and relatively stable bias values after an initial warm-up period, but have a large instability in the bias seen from turn-on to turn-on. The bias and bias random walk largely determine the accuracy of a gyroscope sensor used in the gyrocompass (North-Seeking) mode of operation. An apparatus and a method to correct for the bias error seen after power is applied during drilling is desirable.

One embodiment of the invention accomplishes compensation for the systematic bias error in a gyroscope in an MWD tool by indexing the gyroscope to two positions 180 degrees apart and by using data from these positions to determine the bias. Adding the two measurements results in a cancellation of the positive-going and negative-going signals and a doubling of the bias error. If all other parameters are compensated by a calibration process done prior to the operation of the bottomhole assembly the remaining error in the gyroscope (the bias) is removed after calculation as follows:

$$\text{Bias}=\tfrac{1}{2}((\text{"zero" reading})+(\text{"180" reading})) \quad (1)$$

Mechanical stops can be used to rotate the gyroscope to an arbitrary "zero" position, and then to the "180" position. For a single axis gyroscope, this technique can determine the bias, which is then used to compensate subsequent measurements from the gyroscope, in addition to the previously determined calibration parameters. For a 2-axis gyroscope, the technique of indexing from the "zero" position to the "180" position can provide a measurement of the bias for each of the two (X and Y) transverse axis gyroscopes. Alternatively, a stepper motor or a drive motor with an angular resolver could be used to index 180 degrees from an arbitrary initial position on the rotating axis.

Figure 2C:
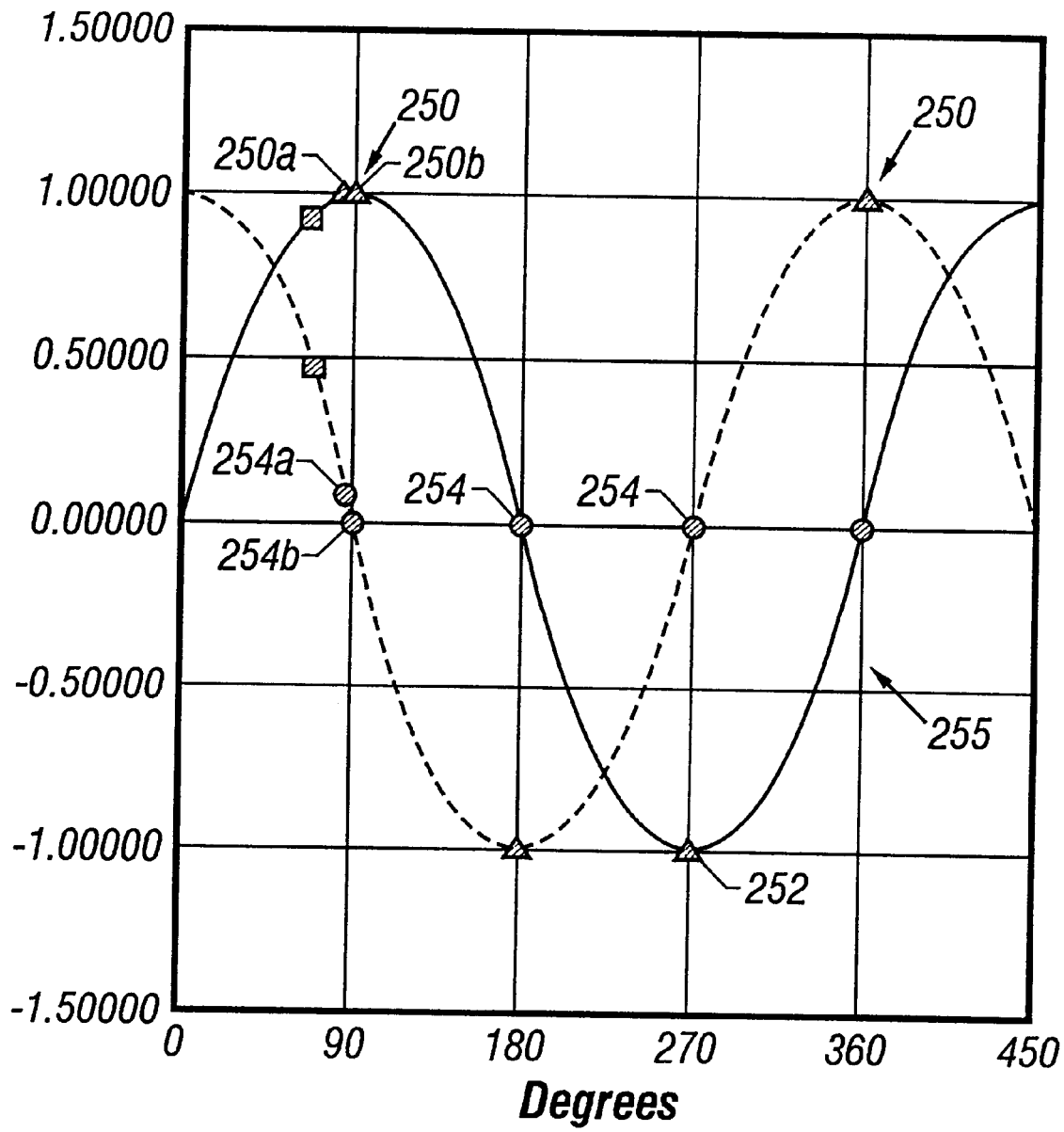
FIGS. 2C and 2D are graphs showing sinusoidal output of a two-axis gyroscope.

This technique is illustrated in the graph shown in FIG. 2C by the small square symbols designated "Initial Measurement Point". This position is shown at 62 degrees on the horizontal axis of the chart, corresponding to a relative roll angle (or toolface angle) of 62 degrees. A second measurement could then be obtained at 62+180, or 242 degrees, and the bias computed for Gyroscope X or Gyroscope Y or both from the measurements at these two positions.

But this technique of taking the first measurement at an arbitrary roll angle position on the graph could result in a gyroscope output occurring near null (zero on the vertical axis.) In such a case, the output of the gyroscope has a steep slope, and is very sensitive to variations in the position along the horizontal axis. To get good results, the indexing from the "zero" point to the "180" point should be done with great precision, and a tight tolerance on the 180 degree movement must be maintained. This tight tolerance on a mechanical indexing apparatus can be difficult to achieve in an MWD device, because of the harsh environment, and the need to provide vibration and shock dampening mounting of the sensitive parts. Elastic mounts are often required, with adequate room for deflection under dynamic loads, and mechanical stops may be damaged by continuous impacts.

Still referring to FIG. 2C, the present invention provides a method of establishing the initial "zero" reference position to minimize the bias measurement errors, while allowing for a less precise mechanical indexing apparatus. Referring to FIG. 2C, it is clear that the output of the gyroscope is less sensitive to angular positioning errors near the peak positive (250) and negative (252) portions of the sinusoidal wave 255. The round points 254a and 254b plotted near the null value of the sine wave at 85 and 90 degrees have significantly more vertical displacement that the triangular points 250a and 250b plotted near the peak of the sine wave 255. It is desirable to measure the "zero" position value for the gyroscope near the positive and negative peaks, and then the "180" degree position near the other peak, in order to minimize the resulting bias measurement error. This can be accomplished by monitoring the output of the gyroscope while rotating. Finding the peak may be done by looking for the position where the slope of the output goes from rising to failing (or vice versa) with increasing angular position. The initial "zero" position measurements can be made at this position and saved for subsequent computation. The drive motor apparatus can then be commanded to advance 180 degrees, and the second "180" position measurements can be made. Alternatively, the "peak finding" technique can be used for the "180" position.

For a two axis gyroscope, the peak finding technique is used to establish the "zero" position for the X gyroscope, and then 3 more positions are used, 90 degrees apart, to make the measurements to compute the bias on both X and Y axes. In the graph above, the triangular points plotted near the peaks of the sinusoidal outputs at 90, 180, 270, and 360 degrees are used to compute the biases on X and Y.

$$\text{Bias } X=\tfrac{1}{2}(X@90+X@270)$$

$$\text{Bias } Y=\tfrac{1}{2}(Y@180+Y@360) \quad (2)$$

Having determined the bias in the two axes by this downhole calibration technique, the outputs of the X and Y axes can then be corrected for this bias at any position on the angular (horizontal) scale. Angular parameters of interest for the downhole MWD assembly (Azimuth and Toolface) can then be computed using values at all 4 or at any of the previously recorded or subsequent indexed positions. The average of the parameters computed at the four indexing positions is typically used.

In summary, the triangular points plotted near the peaks of the sinusoids are used to compute the biases, and then after compensation, these measurements along with the measurements made at the round points plotted near the null values of the sinusoids are used to compute the angular parameters of interest.

Referring back to FIG. 2A, in operation, to determine the toolface, inclination angle and the azimuth of the bottomhole assembly 90, the drilling is interrupted or stopped. The gyroscope is powered and the earth rate measurements from the gyroscope 202 and gravity measurements from each of the accelerometers 204x–204z are taken. As noted-above the gyroscope rate measurements contain systematic biases or errors. To eliminate these systematic errors, a second set of rate measurements are made after rotating the gyroscopes 202 180 degrees at the same wellbore depth and bottomhole assembly position and without switching off the power to the gyroscope 202.

The measurements relating to each axis from the gyroscope made at each position are then differenced to determine the respective biases. The bias corresponding to each axis is preferably stored in a suitable memory in the processor for later use. The biases are used to correct the gyroscopic measurements prior to determining the azimuth or toolface with respect to the true north in the manners described above. These methods largely remove the systematic independent toolface errors. The remaining errors are removed by utilizing predetermined models derived from laboratory measurements made at the surface.

Figure 2D:
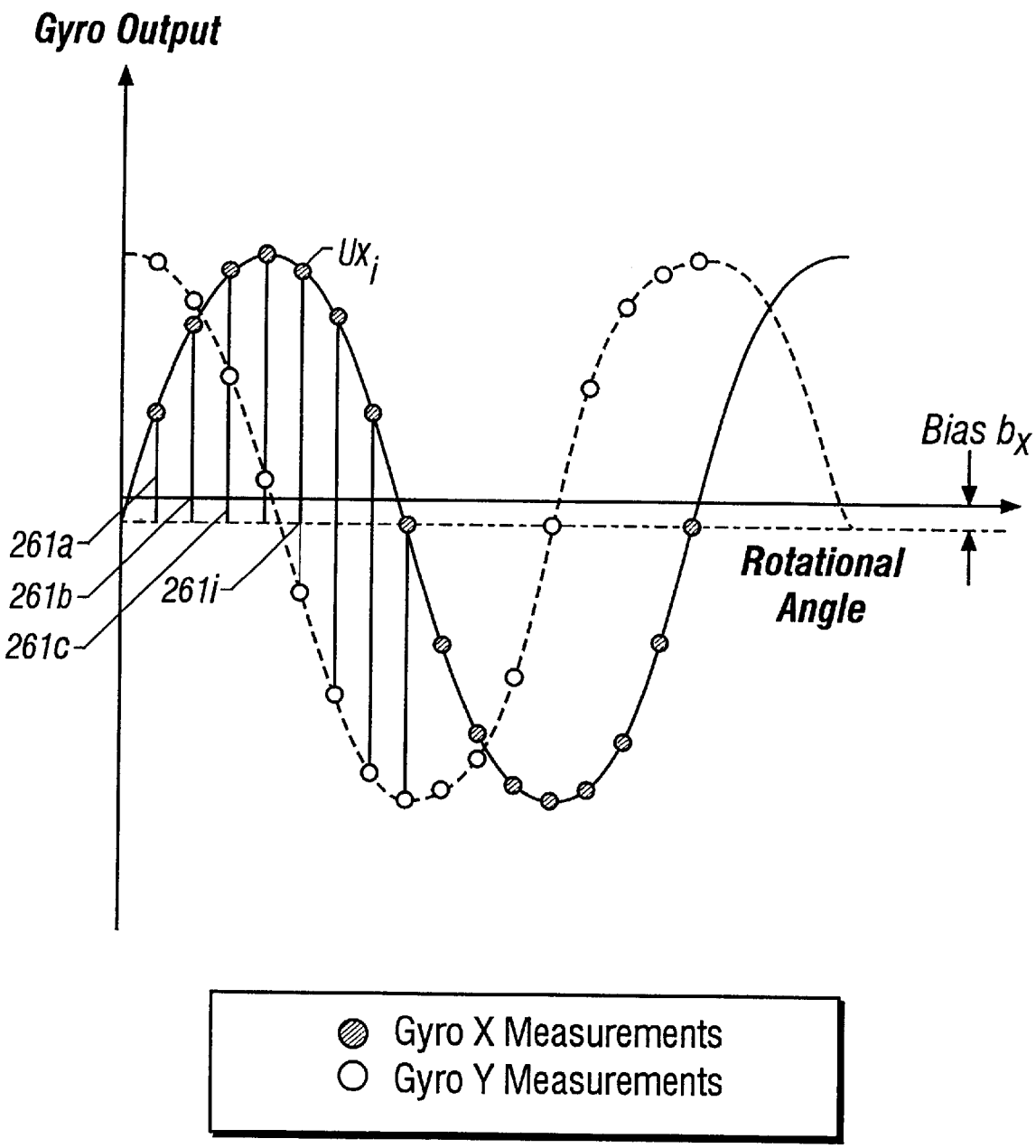

FIG. 2D illustrates another method of correcting for the gyro output. The tool is rotated successively through angles 261a, 261b, ... and at each rotational angle, the gyro output of the X and Y axis gyros is taken. Denoting by $Ux_i$ the measurement of the X gyro at an angle $\theta_i$, the measurements in the presence of random measurement errors $\epsilon_i$, a bias $b_x$ may be represented as $$Ux_i = A\sin(\theta_i + \phi) + b_x + \epsilon_i \tag{3}$$

where $\phi$ is a phase angle and A is the amplitude of the sinusoid. This equation has three parameters to be estimated, namely A, $\phi$, and $b_x$. If measurements are made at three tool rotational angles, these parameters are uniquely determined. If additional measurements are made, then the equations are overdetermined and a solution may be obtained in a least squares sense using methods known in the art. The same procedure may also be used for the measurements made by the Y axis gyro. When both the X and Y axis gyro measurements are used, then there is an additional requirement that the phase term for the x and y directions differ by 90°. This too can be made part of the least squares minimization procedure. FIG. 2D also shows a determined bias $b_x$ in the measurements.

The above-described bias removal methods in realtime downhole during the drilling of the wellbores, referred hereto as the "mechanical-indexing methods," for gyroscopes allow great flexibility of use, minimizing the survey time and power consumption. It allows the determination of the systematic bias errors that typically exist in commercially available gyroscopes, rather than relying on the stability of the bias for such gyroscopes. This further allows the use of gyroscopes that are otherwise unsuitable for use in gyrocompass mode in the MWD environment due to their poor stability or large turn-on to turn-on bias instability. The other term affecting the accuracy of gyroscopic measurement, namely the random walk, is minimized (a) by selecting gyroscopes with relatively low value of random walk by performing tests at the surface prior to their use in the bottomhole assembly and (b) averaging the measurements of the gyroscopes for sufficiently long time periods to remove the statistical variations of such errors.

Figure 3:
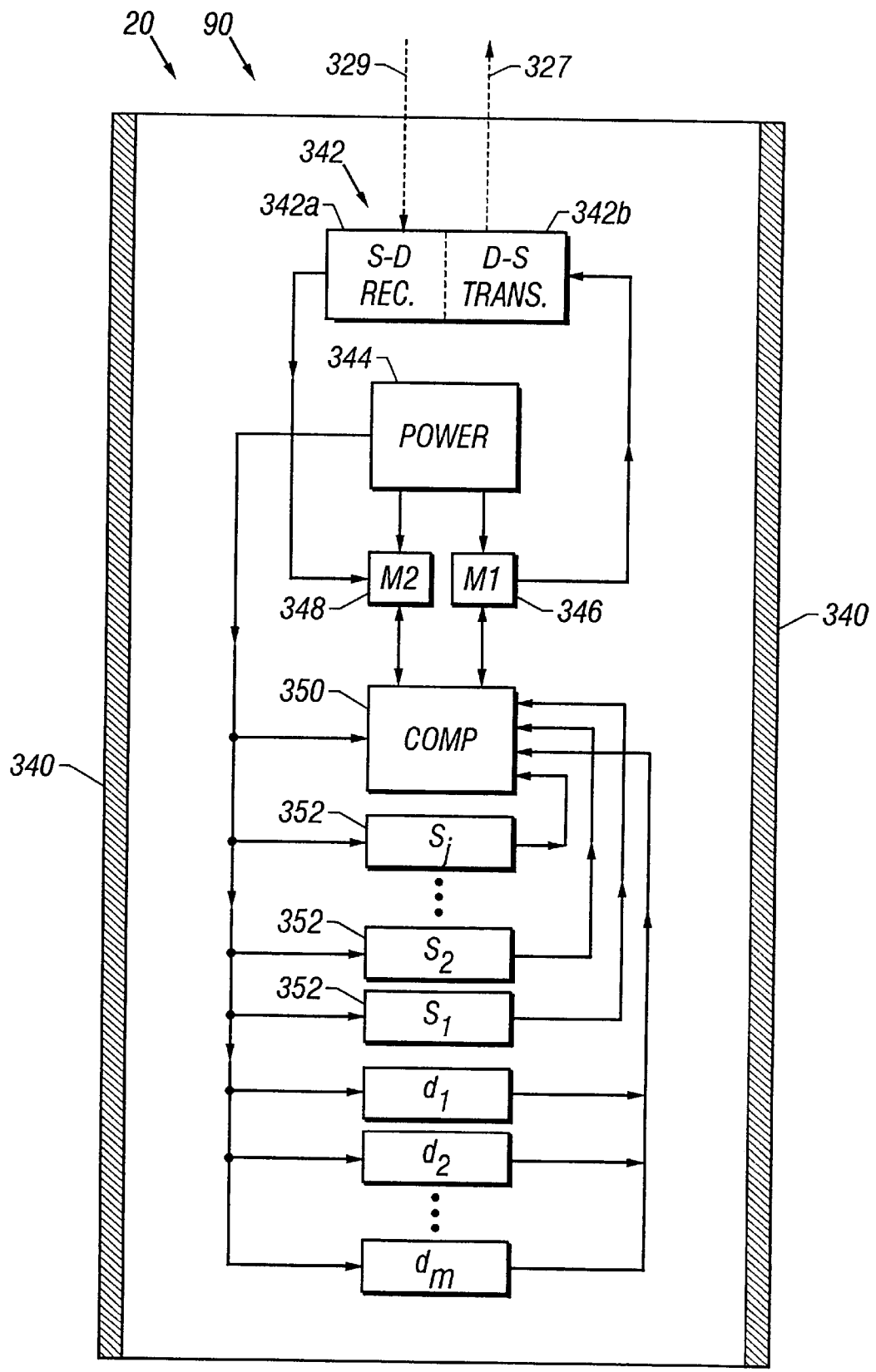
FIG. 3 shows a functional block diagram of the major downhole elements of the system of the present invention.

FIG. 3 shows a functional block diagram of the major elements of the bottom hole assembly 90 and further illustrates with arrows the paths of cooperation between such elements. It should be understood that FIG. 3 illustrates only one arrangement of the elements and one system for cooperation between such elements. Other equally effective arrangements may be utilized to practice the invention. A predetermined number of discrete data point outputs from the sensors 352 ($S_1$–$S_j$) are stored within a buffer which, in FIG. 3, is included as a partitioned portion of the memory capacity of a computer 350. The computer 350 preferably comprises commercially available solid state devices which are applicable to the borehole environment. Alternatively, the buffer storage means can comprise a separate memory element (not shown). The interactive models are stored within memory 348. In addition, other reference data such calibration compensation models and predetermined drilling path also are stored in the memory 348. A two way communication link exists between the memory 348 and the computer 350. The responses from sensors 352 are transmitted to the computer 350 and or the surface computer 40 wherein they are transformed into parameters of interest using methods which will be detailed in a subsequent section hereof.

The computer 350 also is operatively coupled to certain downhole controllable devices d1–dm, such as a thruster, adjustable stabilizers and kick-off subassembly for geosteering and to a flow control device for controlling the fluid flow through the drill motor for controlling the drill bit rotational speed.

The power sources 344 supply power to the telemetry element 342, the computer 350, the memory modules 346 and 348 and associated control circuits (not shown), and the sensors 352 and associated control circuits (not shown). Information from the surface is transmitted over the downlink telemetry path illustrated by the broken line 329 to the downhole receiving element of downhole telemetry unit 342, and then transmitted to the storage device 348. Data from the downhole components is transmitted uphole via link 327. In the present invention, the parameters of interest such as toolface, inclination and azimuth are preferably computed downhole and only the answers are transmitted to the surface.

Figure 4:
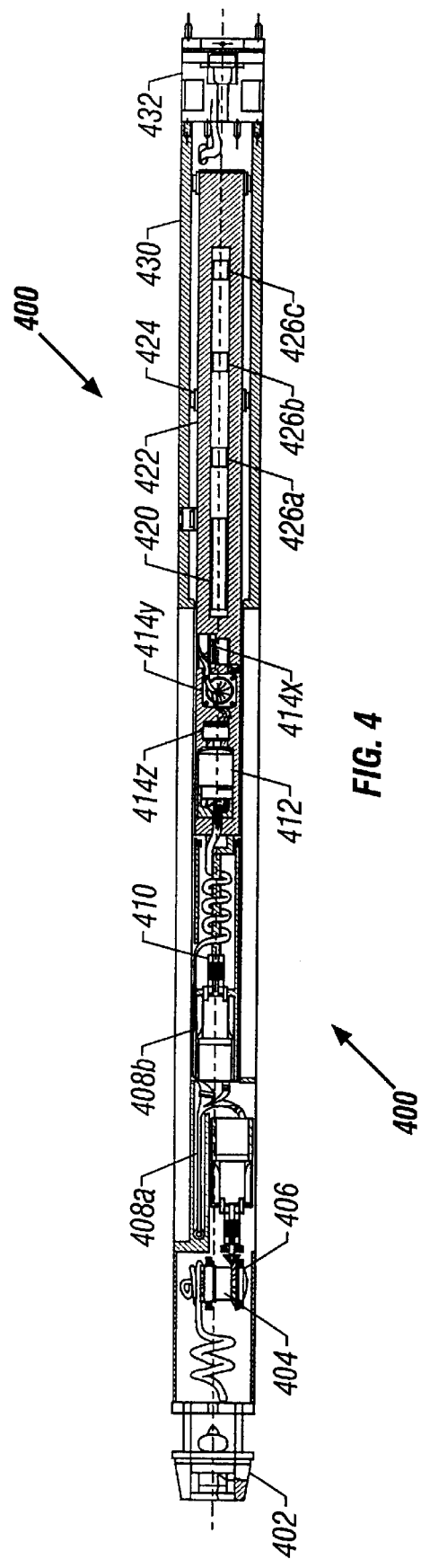
FIG. 4 shows an embodiment of the invention using two motors to drive two gyros, one of which is coupled to the magnetometers and the accelerometers.

FIG. 4 shows a sensor section 400 containing gyroscopes 404, 412, a set of three accelerometers 414x, 414y and 414z disposed at a suitable location in the bottomhole assembly 90 according to another embodiment of the present invention. The gyroscopes 404, 412 are preferably two-axis gyroscopes. The sensor section also contains three three-axis magnetometers 426a, 426b, and 426c. The instruments are enclosed in a housing 430 with a downhole coupler 432 and an uphole coupler 402. A stepper motor 408b drives the sensors 404, 412, 414x, 414y, 414z, 426a, 426b, and 426c downhole of the stepper motor 408b by a flex coupling 410 so that the sensors can be stepped through a series of azimuthal positions with respect to the tool axis. The magnetic sensors 426a, 426b, and 426c and the magnetometer board 420 are supported on a chassis 420 by non-magnetic bearings 424. With this arrangement, as the gyroscope 412 is stepped through a number of angles to determined its bias, the magnetometers and the accelerometers are being stepped in unison with the gyroscope. Using methods described above with reference to the gyroscope, the bias in the accelerometers 414x and 414y and the magnetometers 426a, 426b, and 426c can be determined and subsequent survey measurements can be compensated for this bias.

In the absence of local magnetic perturbations, such as those caused by steel objects in the sensor assembly or in the proximity of the sensor assembly, there should be no z-gradient of the magnetic field, i.e., the long axis components of magnetic sensors 426a, 426b, and 426c should all have the same value. If the actual measurements do not satisfy this condition, then it is indicative of a local magnetic disturbance. The magnetic field disturbance caused by a magnetic object in the borehole or in the vicinity of the borehole follows the well known inverse square law, and by using known modeling techniques, the location and the strength of the disturbance can be ascertained from a plurality of magnetic measurements. This makes it possible to correct the magnetometer measurements for the disturbance and also determine an axial distance along the borehole where the z-gradient is substantially zero and the magnetic field substantially undisturbed.

Still referring to FIG. 4, the sensor assembly also includes a second gyroscope 404 driven by a second stepper motor 408a through a bevel gear 406. Using the methodology described above, the bias of this gyro can also be determined during logging operations, the difference being that in this case, it is the y- and z- components of the bias that are determined by rotating the gyro 412 through a number of different angles and making measurements at each angle.

Once the observations have been corrected for bias, the three sets of measurements based upon the three types of sensors can be used to obtain an improved estimate of the tool orientation. As discussed in U.S. Pat. No. 5,432,699, the angular velocity $\omega^g$ as measured by the gyroscopes is the sum of the angular velocity vector $\omega^e$ of the earth and the angular velocity $\omega^p$ of the tool relative to the earth $$\omega^g = \omega^e + \omega^p \quad (4)$$

The magnetometer and accelerometer measurements each give independent measurements of the motion of the tool relative to the earth. The equations denoted by (4) are overdetermined and may be solved to obtain an improved estimate of the actual orientation of the tool with respect to the earth using prior art methods. Since the magnetometer gives an orientation with respect to the earth's magnetic field, the method readily gives a measurement of the magnetic declination (angle between geographic and magnetic north).

Figure 5:
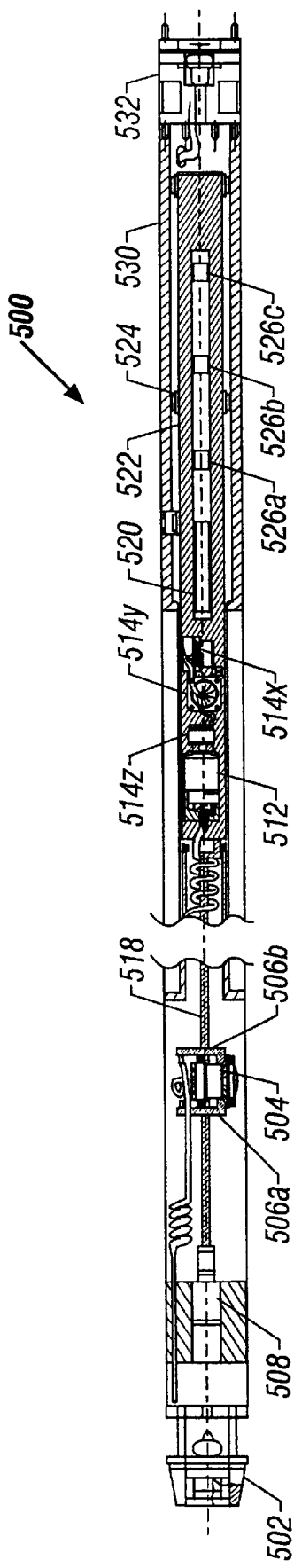
FIG. 5 shows an embodiment of the invention using a single motor to drive two gyros, one of which is coupled to the magnetometers and the accelerometers.

FIG. 5 shows another embodiment of the invention using two gyroscopes. The sensor section 500 contains gyroscopes 504, 512, and a set of three accelerometers 514x, 514y and 514z disposed at a suitable location in the bottomhole assembly 90. The gyroscopes 504, 512 are preferably two-axis gyroscopes. The sensor section also contains three three-axis magnetometers 526a, 526b, and 526c. The instruments are enclosed in a housing 530 with a downhole coupler 532 and an uphole coupler 502. A stepper motor 508 drives the transverse gyroscope 504 through a bevel gear 506a, the motion of the stepper motor being further transmitted through bevel gear 506b to a shaft 518. Sensors 512, 514x, 514y, 514z, 526a, 526b, and 526c are driven in synchronization with the gyroscopic sensor 504. The magnetic sensors 526a, 526b, and 526c and the magnetometer board 520 are supported on a chassis 522 by non-magnetic bearings 524. Using methods described above with reference to the gyroscope, the bias in the gyroscopes 504, 512, the accelerometers 514x, 514y and 514z and the magnetometers 526a, 526b, and 526c can be determined and subsequent survey measurements can be compensated for this bias. The bias corrected measurements are then used to obtain an improved estimate of the tool position and orientation using the method discussed above with reference to FIG. 4.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of making measurements using a sensor assembly including a two-axis gyroscope rotatably mounted in a measurement-while-drilling ("MWD") tool in a bottomhole assembly having a drillbit thereon during the drilling of a borehole, the method comprising:

(a) locating the MWD tool in the borehole at a first predetermined depth;

(b) taking a measurement from the two-axis gyroscope and at least one additional sensor on the sensor assembly at a first rotational position of the sensor at the first predetermined depth;

(c) rotating the sensor assembly a predetermined angle relative to the first position about a known axis of the sensor to at least one additional rotational position at the predetermined depth and taking a measurement from the two-axis gyroscope and the at least one additional sensor at the at least one additional position;

(d) using a processor on the tool for combining measurements made by the two-axis gyroscope and the at least one additional sensor at the first and at least one additional rotational position to determine a bias in the measurements in at least one of (i) the two-axis gyroscope, and, (ii) the at least one additional sensor, and obtaining corrected measurements therefrom; and (e) determining from said corrected measurements a parameter of interest selected from the group consisting of (i) an azimuth with respect to the true north, (ii) toolface orientation with respect to the true north, iii) amplitude of measurements of the earth's rate vector for a two-axis gyroscope, (iv) amplitude of measurements of the earth's rate vector for a three-axis gyroscope, and (v) local apparent latitude for a three-axis gyroscope.

2. The method of claim 1 wherein the at least one additional sensor is selected from the group consisting of: (A) an accelerometer, and, (B) a magnetometer, and (C) a gyroscope.

3. The method of claim 2, wherein at least one additional sensor comprises a magnetometer and the parameter of interest further comprises magnetic declination at the borehole.

4. The method of claim 1 further comprising taking measurements with the two-axis gyroscope and the at least one additional sensor at a second predetermined depth, obtaining corrected measurements therefrom, and monitoring changes in the parameter of interest.

5. The method of claim 1 wherein the first rotational position corresponds to a peak output value of the two-axis gyroscope.

6. The method of claim 1 wherein the at least one additional rotational position further comprises at least two additional positions and the combining of the measurements further comprises fitting a sinusoid to the measurements.

7. The method of claim 1 wherein the at least one additional sensor further comprises three three-axis magnetic sensors spaced axially apart on the MWD tool, the method further comprising determining a position and strength of a local magnetic disturbance.

8. The method of claim 1 rotating the sensor assembly further comprises using a stepping motor.

9. The method of claim 1 wherein the at least one additional sensor further comprises three three-axis magnetic sensors spaced axially apart on the MWD tool, the method further comprising determining a position where a gradient of the magnetic field is substantially zero.

10. A measurement-while-drilling (MWD) downhole assembly for use in drilling boreholes, comprising:
   (a) a housing;
   (b) sensor assembly including a two-axis gyroscope and at least one additional sensor rotatably mounted in the housing for providing signals relating to the motion of the tool;
   (c) a device in the tool for rotating the sensor assembly about an axis of the sensor assembly; and
   (d) a processor in the tool, said processor combining signals from the sensor assembly taken at positions corresponding to a plurality of rotational positions at a predetermined depth in the borehole to determine a bias present in the measurements made by the sensor assembly during drilling of the borehole and determining therefrom corrected measurements, the processor further using said corrected measurements to determine a parameter of interest selected from the group consisting of (i) an azimuth with respect to the true north, (ii) toolface orientation with respect to the true north, iii) amplitude of measurements of the earth's rate vector for a two-axis gyroscope, (iv) amplitude of measurements of the earth's rate vector for a three-axis gyroscope, and (v) local apparent latitude for a three-axis gyroscope.

11. The MWD assembly of claim 10 wherein the at least one additional sensor is selected from the group consisting of (A) an accelerometer, and (B) a magnetometer.

12. The MWD assembly of claim 10 wherein the processor further corrects measurements from the sensor assembly taken at a borehole depth at other than the predetermined depth to monitor changes in the parameter of interest.

13. The MWD assembly of claim 10 wherein at least one of the plurality of rotational positions corresponds to a peak value of a measurement from the sensor assembly.

14. The MWD assembly of claim 10 wherein the at least one additional sensor further comprises three magnetic sensors spaced apart axially on the MWD tool, the processor further combining signals from the three magnetic sensors to determine a position and strength of a local magnetic disturbance.

15. The MWD assembly of claim 10 wherein the at least one additional sensor is selected from the group consisting of (i) a magnetometer, and, (ii) an accelerometer.

16. The MWD assembly of claim 15 the processor further determining a parameter of interest utilizing a measurement from the gyroscope corrected for said bias, and a measurement from the at least one additional sensor.

17. The MWD assembly of claim 16, wherein the parameter of interest is selected from a group consisting of (i) an azimuth with respect to the true north, (ii) toolface orientation with respect to the true north, iii) amplitude of measurements of the earth's rate vector for a two-axis gyroscope, (iv) amplitude of measurements of the earth's rate vector for a three-axis gyroscope, and (v) local apparent latitude for a three-axis gyroscope, and, (vi) magnetic declination at the borehole.

18. The MWD assembly of claim 10 further comprising a stepping motor for rotating the sensor assembly.

19. The MWD assembly of claim 10 wherein the two-axis gyroscope has an axis of rotation parallel to an axis of the assembly and the at least one additional sensor comprises an additional two-axis gyroscope with its axis of rotation orthogonal to the axis of rotation of the first gyroscope.

20. The MWD assembly of claim 19 further comprising a first stepping motor for rotating the two-axis gyroscope and a second stepping motor for rotating the additional two-axis gyroscope.

21. The MWD assembly of claim 19 further comprising a single stepping motor for simultaneously rotating the two axis gyroscope and the additional two-axis gyroscope.

22. A method of making measurements using a sensor assembly including a gyroscope rotatably mounted in a measurement-while-drilling ("MWD") tool in a bottomhole assembly having a drillbit thereon during the drilling of a borehole, the method comprising:
   (a) locating the MWD tool in the borehole at a first predetermined depth;
   (b) taking a measurement from the gyroscope and at least one additional sensor on the sensor assembly at a first rotational position of the sensor at the first predetermined depth;
   (c) rotating the sensor assembly a predetermined angle relative to the first position about a known axis of the sensor to at least a one additional rotational position at the predetermined depth and taking a measurement from the gyroscope and the at least one additional sensor at the at least one additional position; and
   (d) using a processor on the tool for combining measurements made by the gyroscope and the at least one additional sensor at the first and the at least one additional rotational position to determine a bias in the measurements in at least one of (i) the gyroscope, and, (ii) the at least one additional sensor, and obtaining corrected measurements therefrom.

23. The method of claim 22 wherein the gyroscope is a two-axis gyroscope.

24. The method of claim 23 further comprising determining from said corrected measurements a parameter of interest selected from the group consisting of (i) an azimuth with respect to the true north, (ii) toolface orientation with respect to the true north, iii) amplitude of measurements of the earth's rate vector for a two-axis gyroscope, (iv) amplitude of measurements of the earth's rate vector for a three-axis gyroscope, and (v) local apparent latitude for a three-axis gyroscope.

25. A method of making measurements made by at least one sensor rotatably mounted in a measurement-while-drilling ("MWD") tool in a bottomhole assembly having a drillbit thereon during the drilling of a borehole, the method comprising:
   (a) locating the MWD tool in the borehole at an arbitrary depth;
   (b) taking a measurement from the at least one sensor at a first rotational position of the sensor at the predetermined depth;
   (c) using a stepper motor to rotate the at least one sensor a predetermined angle relative to the first rotational position about a known axis of the sensor to at least one additional rotational position at the predetermined depth and taking a measurement from the at least one sensor at the at least one additional rotational position; and (d) using a processor on the tool for combining the first measurement and the at least second measurement to determine a bias in the measurements made by the at least one sensor.

26. The method of claim 25, further comprising correcting at least one of the first and one additional measurements utilizing the determined bias.

27. The method of claim 25 wherein the at least one sensor is selected from the group consisting of: (i) an accelerometer, (ii) a magnetometer, and (iii) a two-axis gyroscope.

28. The method of claim 26 further comprising determining a parameter of interest utilizing the corrected measurement.

29. The method of claim 28, wherein the at least one sensor is a two-axis gyroscope and the parameter of interest is selected from the group consisting of (i) an azimuth with respect to the true north, (ii) toolface orientation with respect to the true north, iii) amplitude of measurements of the earth's rate vector for a two-axis gyroscope, (iv) amplitude of measurements of the earth's rate vector for a three-axis gyroscope, and (v) local apparent latitude for a three-axis gyroscope.

30. The method of claim 25 wherein the first position corresponds to a peak output value of the at least one sensor.

31. The method of claim 25 wherein the at least one additional position further comprises at least two additional positions and the combining of the measurements further comprises fitting a sinusoid to the measurements.

32. The method of claim 25 wherein the at least one sensor further comprises three three-axis magnetic sensors spaced axially apart on the MWD tool, the method further comprising determining a position and strength of a local magnetic disturbance.

* * * * *